United States Patent
Saund

(10) Patent No.: US 9,536,141 B2
(45) Date of Patent: Jan. 3, 2017

(54) SYSTEM AND METHOD FOR FORMS RECOGNITION BY SYNTHESIZING CORRECTED LOCALIZATION OF DATA FIELDS

(75) Inventor: Eric Saund, San Carlos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 782 days.

(21) Appl. No.: 13/537,729

(22) Filed: Jun. 29, 2012

(65) Prior Publication Data

US 2014/0006917 A1 Jan. 2, 2014

(51) Int. Cl.
G06F 17/00 (2006.01)
G06K 9/00 (2006.01)
G06F 17/24 (2006.01)

(52) U.S. Cl.
CPC ......... *G06K 9/00449* (2013.01); *G06F 17/248* (2013.01); *G06K 9/00463* (2013.01)

(58) Field of Classification Search
CPC .................... G06K 9/00463; G06F 17/248
USPC ............................. 715/222; 382/283
See application file for complete search history.

(56) References Cited

U.S. PATENT DOCUMENTS

| | | | | |
|---|---|---|---|---|
| 5,140,650 A * | 8/1992 | Casey | ............... | G06K 9/00449 382/176 |
| 5,299,305 A * | 3/1994 | Oomae | ............... | G06F 17/243 715/200 |
| 5,459,796 A * | 10/1995 | Boyer | ............... | G06F 17/243 345/17 |
| 5,721,940 A * | 2/1998 | Luther | ............... | G06F 17/243 715/200 |
| 5,819,293 A * | 10/1998 | Comer | ............... | G06F 17/243 |
| 5,963,966 A * | 10/1999 | Mitchell | ............ | G06K 9/00442 707/E17.013 |
| 5,995,985 A * | 11/1999 | Cai | ............... | G06F 17/211 715/201 |
| 6,084,585 A * | 7/2000 | Kraft | ............... | G06F 3/04895 715/205 |
| 6,466,954 B1 * | 10/2002 | Kurosawa et al. | ........... | 715/209 |
| 6,751,779 B1 * | 6/2004 | Kurosawa et al. | ........... | 715/209 |
| 6,885,769 B2 | 4/2005 | Morita et al. | | |
| 7,003,166 B2 | 2/2006 | Abhyankar et al. | | |
| 7,043,529 B1 * | 5/2006 | Simonoff | ............... | H04L 67/02 709/204 |
| 7,581,177 B1 * | 8/2009 | Mollicone et al. | ........... | 715/243 |
| 8,112,413 B2 * | 2/2012 | Krishna et al. | ............... | 707/713 |
| 8,249,906 B2 * | 8/2012 | Ponce de Leon | ...... | G06Q 10/06 705/28 |
| 8,649,600 B2 * | 2/2014 | Saund | ........................ | 382/175 |
| 8,666,772 B2 | 3/2014 | Kaniadakis | | |

(Continued)

OTHER PUBLICATIONS

"An Interactive Document Image Descriptor for OCR of Handwritten Forms" by David Monger, Graham Leedham and Andy Downton; University of Essex, United Kingdom; Copyright 1993 IEEE.*

(Continued)

*Primary Examiner* — Laurie Ries
(74) *Attorney, Agent, or Firm* — Fay Sharpe LLP

(57) ABSTRACT

A method and system generates an idealized image of a form. An image of a form and a template model of the form are received. The form includes data fields. Word boxes of the image are identified. The word boxes are assigned to corresponding data fields of the form. An idealized image of the from is generated based on the assignments and the template model.

25 Claims, 13 Drawing Sheets

(56) References Cited

U.S. PATENT DOCUMENTS

| | | |
|---|---|---|
| 8,781,229 B2* | 7/2014 | Saund .................. 382/182 |
| 2002/0087382 A1 | 7/2002 | Tiburcio |
| 2003/0167265 A1* | 9/2003 | Corynen ............ G06Q 10/04 |
| 2004/0181749 A1* | 9/2004 | Chellapilla ......... G06F 17/243 |
| | | 715/222 |
| 2006/0274057 A1* | 12/2006 | Van Ness .......... G06F 3/04883 |
| | | 345/179 |
| 2007/0036433 A1 | 2/2007 | Teutsch et al. |
| 2009/0031227 A1* | 1/2009 | Chakrabarti ......... G06F 9/4443 |
| | | 715/763 |
| 2010/0262900 A1* | 10/2010 | Romatier ............. G05B 17/02 |
| | | 715/219 |
| 2011/0293187 A1 | 12/2011 | Sarkar et al. |

OTHER PUBLICATIONS

"Block Selection: A Method for Segmenting Page Image of Various Editing Syles" by Shin-Ywan Wang and Toshiaki Yagasaki, Canon, Copyright 1995 IEEE.*

"Information extraction by finding repeated structure" by Evgeniy Bart and Prateek Sarkar, Palo Alto Research Center, Copyright 2010 ACM.*

Hurst, Nathan, et al, "Minimum Sized Text Containment Shapes", Proceedings of the 2006 ACM Symposium on Document Engineering, DocEng'06, 2006, pp. 3-12.*

* cited by examiner

FIG. 1

SYSTEM AND METHOD FOR FORMS RECOGNITION BY SYNTHESIZING CORRECTED LOCALIZATION OF DATA FIELDS

BACKGROUND

The present exemplary embodiments disclosed herein relate generally to image processing. They find particular application in conjunction with localizing data fields of forms, and will be described with particular reference thereto. However, it is to be appreciated that the present exemplary embodiments are also amenable to other like applications.

Forms are a type of document that provide pre-defined data fields for entry of data. The spatial organization of data fields facilitates capture of data in a structured and organized fashion by human and automatic means. In a straightforward case, each data field can be cropped out of an image of the form and run through Optical Character Recognition (OCR) individually. This is called zonal OCR.

In an industrial production document processing application, it is desirable to use zonal OCR algorithms. One advantage of zonal OCR algorithms is that they enhance accuracy of OCR by constraining the character set and character combinations (lexicon) allowed on a per-field basis. Another advantage is that they may be built into highly efficient production workflows. In a production setting, it can be cumbersome or impossible to redefine the boundaries of each data field in a zonal OCR process on an image-by-image basis using the output of the assignment algorithm.

Zonal OCR works correctly when printed and/or handwritten data is confined to the correct locations on the form, as defined by the boundaries of the data fields. However, zonal OCR fails to work correctly when printed and/or handwritten data is misregistered with respect to the data fields.

With reference to FIG. 1, an example of a color-dropout form is provided. As illustrated, all of the background form information has been removed and the only markings scanned are printed and/or handwritten data entries and image noise. Further, boxes representing the nominal locations and boundaries of the data fields are overlaid on the color-dropout form. Color-dropout forms are convenient because the printed background form information generally cannot be confused with entered data. With reference to FIG. 2, a close-up of a region of the color-dropout form illustrates misregistration between data and data field boundaries.

In view of the foregoing, a challenge with zonal OCR is how to associate printed and/or handwritten data with corresponding data fields even when the data falls outside the delineated boundaries of the data fields. A solution to this challenge would advantageously permit zonal OCR to be applied to documents whose data actually occurs outside of intended field boundaries.

Known solutions expand the data field boundaries used for zonal OCR. This works satisfactorily as long as the boundary expansion includes the intended data, but does not include data from adjacent fields. However, when data fields are close together and/or data is misregistered, this approach leads to incorrect assignments of data to data fields.

The present application provides new and improved methods and systems which overcome the above-referenced challenges.

INCORPORATION BY REFERENCE

U.S. patent application Ser. No. 13/537,630 for SYSTEM AND METHOD FOR LOCALIZING DATA FIELDS ON STRUCTURED AND SEMI-STRUCTURED FORMS, by Eric Saund, filed on even date herewith, U.S. patent application Ser. No. 12/788,852 for SYSTEM AND METHOD FOR EFFICIENT INTERPRETATION OF IMAGES IN TERMS OF OBJECTS AND THEIR PARTS, by Prateek Sarkar and Evgeniy Bart, filed May 27, 2010, and U.S. patent application Ser. No. 13/022,877 for FINDING REPEATED STRUCTURE FOR DATA EXTRACTION FROM DOCUMENT IMAGES, by Evgeniy Bart, Prateek Sarkar, and Eric Saund, filed on Feb. 8, 2011, are each hereby incorporated herein by reference in entirety.

BRIEF DESCRIPTION

According to one aspect of the present application, a method for generating an idealized image of a form is provided. The method, performed by at least one processor, includes receiving an image of a form and a template model of the form. The form includes data fields. Word boxes of the image are identified. The word boxes are assigned to corresponding data fields of the form and an idealized image of the form is generated from the assignments and the template model.

According to another aspect of the present application, a system for generating an idealized image of a form is provided. The system includes at least one processor programmed to receive an image of a form and a template model of the form, the form including data fields. Word boxes of the image are identified. The word boxes are assigned to corresponding data fields of the form and an idealized image of the form is generated from the assignments and the template model.

According to another aspect of the present application, a data extraction system is provided. The system includes at least one processor programmed to receive an image of a form and a template model of the form. The form includes data fields. Word boxes of the image are identified. The word boxes are grouped into candidate zones, where each candidate zone includes one or more of the word boxes. Hypotheses are formed from the data fields and the candidate zones. Each hypothesis assigns one of the candidate zones to one of the data fields. A constrained optimization search of the hypotheses is performed for an optimal set of hypotheses. The optimal set of hypotheses optimally assign the word boxes to corresponding data fields. An idealized image of the form is generated from the assignments and the template model. Zonal optical character recognition is performed on the idealized image to identify data entries and the identified data entries are extracted.

BRIEF DESCRIPTION OF THE DRAWINGS

FIG. 1 illustrates a color-dropout form with the background information removed and ideal field boundaries shown in overlay.

DETAILED DESCRIPTION

Figure 1:
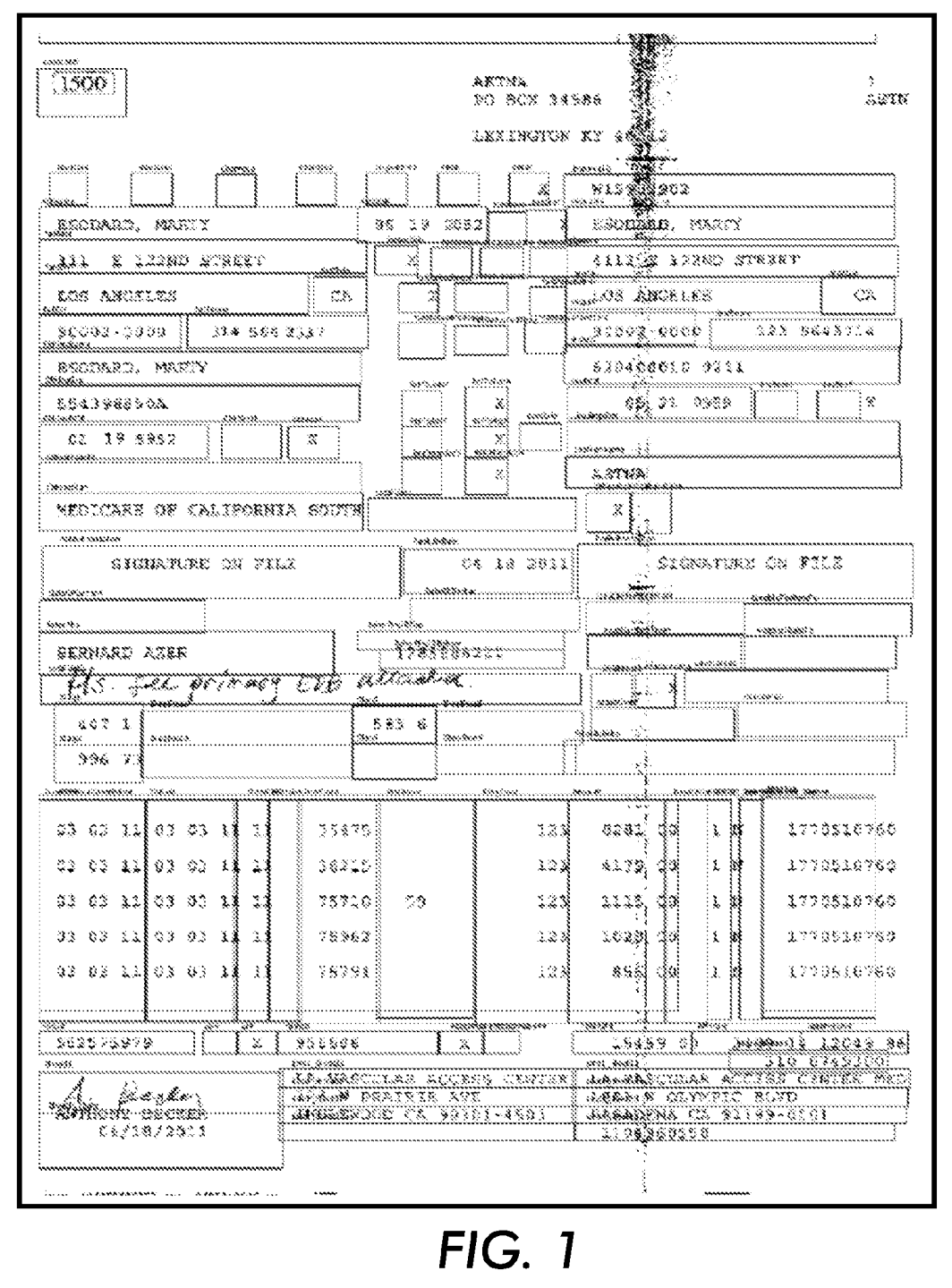
Figure 2:
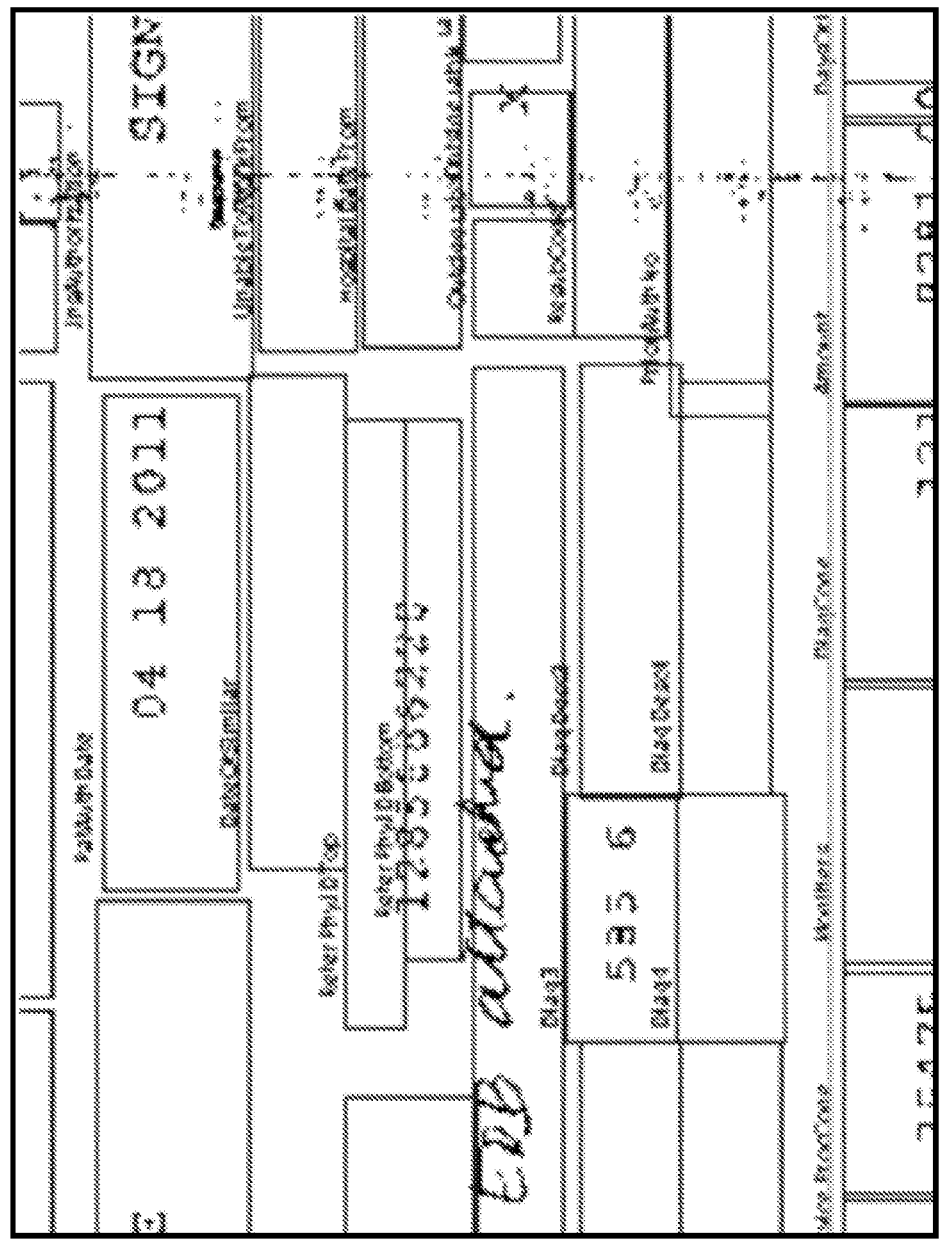
FIG. 2 illustrates a close-up of a region of the color-dropout form of FIG. 1, the close-up showing misregistration.
Figure 3:
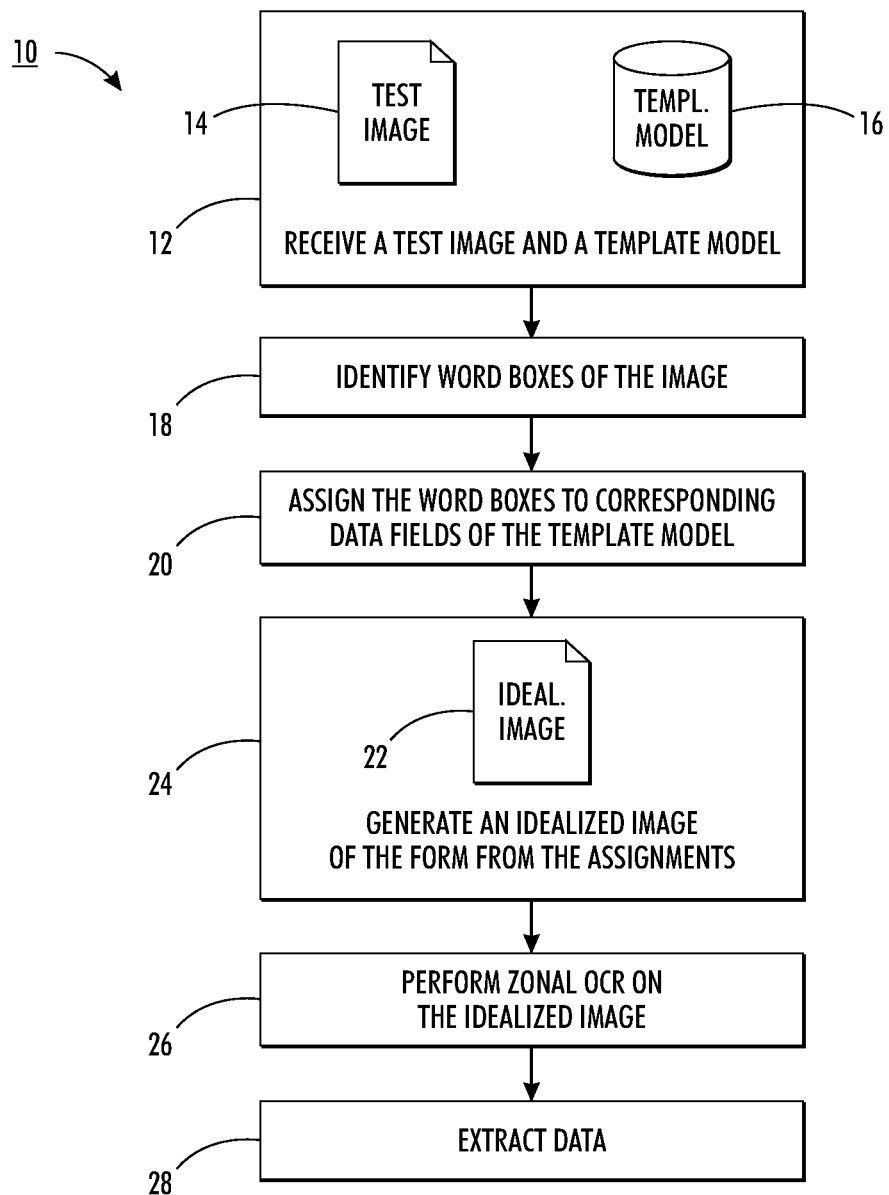
FIG. 3 illustrates a block diagram of a method for data extraction.

With reference to FIG. 3, a block diagram of a method 10 for data extraction according to the preset concepts is provided. The method 10 includes receiving 12 a test image 14 of a form, such as the form of FIG. 1, and a template model 16 of the form. The form includes one or more data fields, typically, a plurality, and a layout specified by the positioning of the data fields on the form. The template model 16 identifies, for each data field of the form, the type of text pattern the data field is expected to contain and the placement, including location and size, of the data field on the form. The form is typically a color-dropout form with the background form information removed (such as shown in FIG. 1), thereby leaving only data and image noise. However, other types of forms, such as non-color-dropout forms, are also contemplated.

Using the test image 14 and the template model 16, word boxes (i.e., data items) are identified 18 in the test image 14. A word box with its text string identifies a bounding box for, and the characters of, a grouping of characters on a text line. The identification includes whole-page optical character recognizing the test image 14 to identify characters of the test image 14 and grouping the identified characters into the word boxes. A text line can be determined according to vertical (y-axis) position of identified characters. For example, characters within a predetermined distance of a horizontal line are part of a text line. A grouping of characters can be determined according to horizontal (x-axis) position of identified characters. For example, a character within a predetermined distance of an adjacent character of the text line is part of the same group as the adjacent character. Commercially available OCR engines are known which can generate the word boxes. After identifying the word boxes, the word boxes are assigned 20 to the data fields of the template model.

Figure 4:
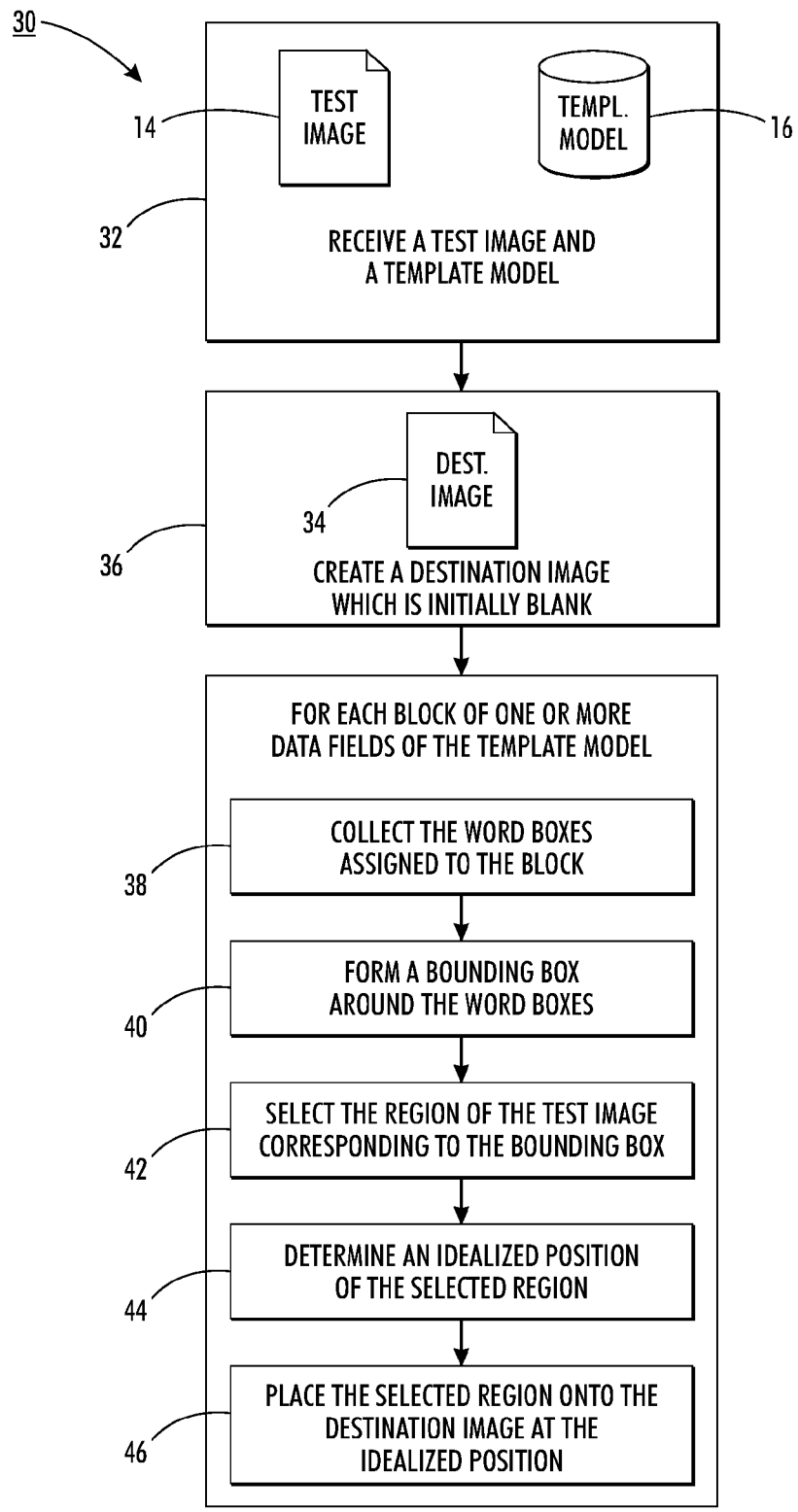
FIG. 4 illustrates a block diagram of a method for generating an idealized image of the form.

Assuming the word boxes are identified and assigned, an idealized image 22 of the form is generated 24 from the assignments. As will be seen, once the idealized image 22 has been generated, zonal OCR is performed on the idealized image 26. With reference to FIG. 4, a more detailed block diagram of a method 30 for generating the idealized image 22 is provided. The method 30 includes receiving 32 the test image 14 and the template model 16. A destination image 34 with the same dimensions as the page defined by the template model 16 is created 36. The destination image 34 is initially blank.

Figure 5:
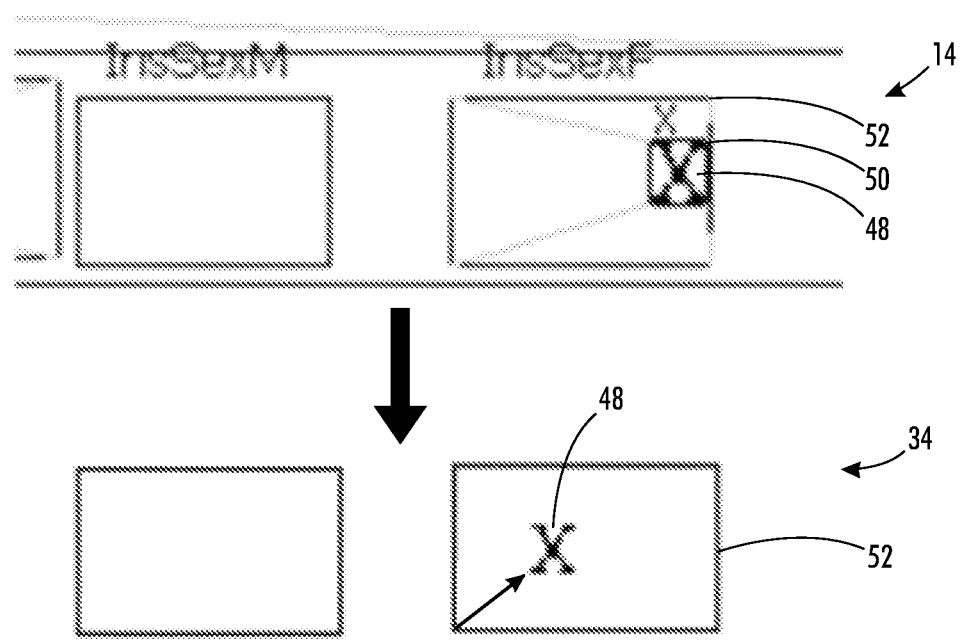
FIG. 5 illustrates the placement of a region corresponding to a word box at its idealized position.
Figure 6:
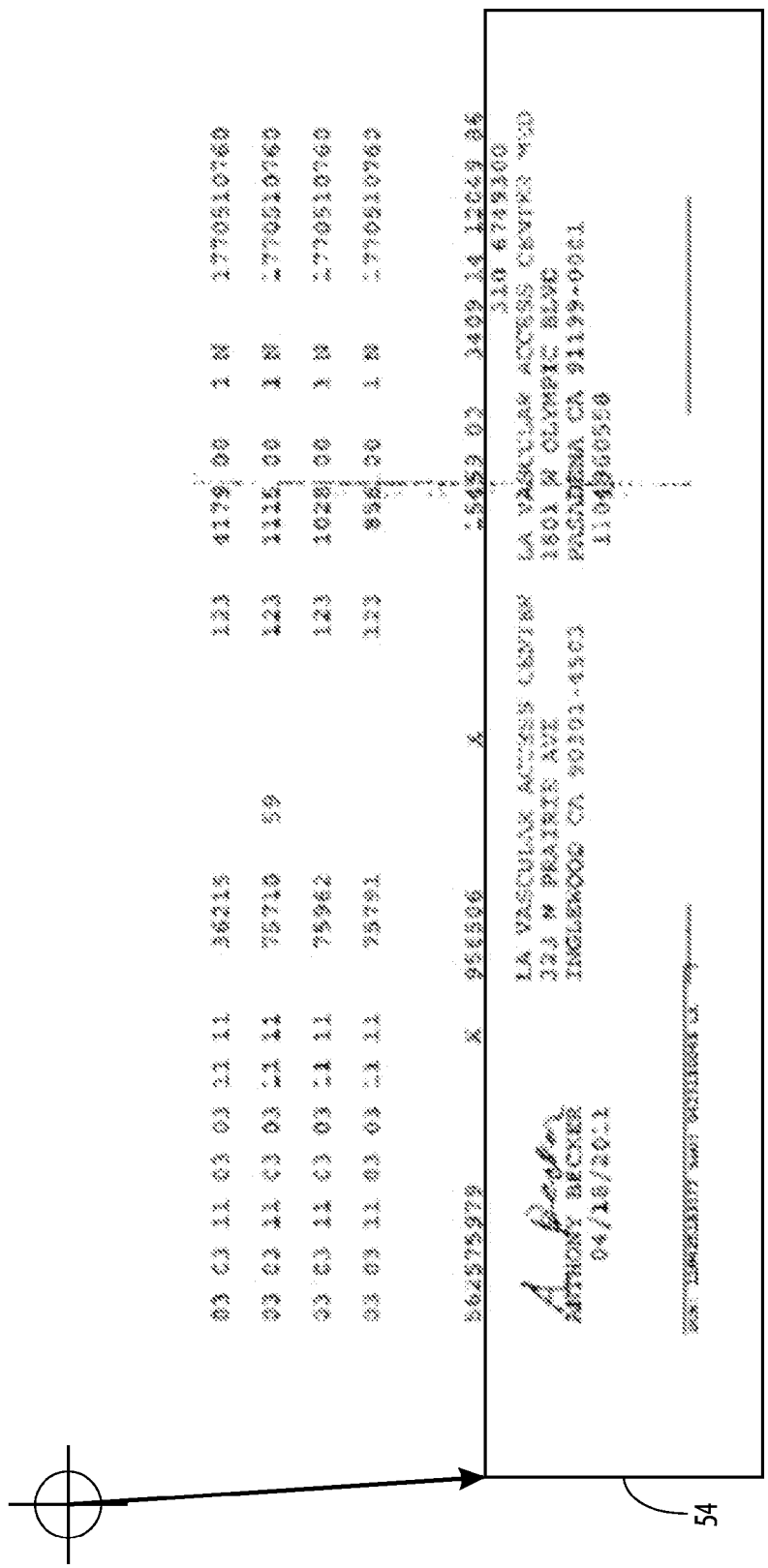
FIG. 6 illustrates the placement of a region corresponding to a block of a plurality of data fields at its idealized position.

For each block of the template model 16, the word boxes assigned to the block are collected 38. A block is a collection of one or more data fields. The blocks of the template model 16 include all the data fields of the template model 16 and are mutually exclusive (i.e., no block includes a data field of another block). Typically, a block includes only one data field. However, it may be desirable to displace certain data fields together. Hence, a block can include a plurality of data fields in such a situation. A bounding box is formed 40 around the word boxes, and the region of the test image 14 defined by the bounding box is selected 42. The bounding box surrounds all the word boxes of the block. For example, when the block includes a plurality of data fields, the bounding box surrounds all the word boxes of the plurality of data fields. An idealized position of the selected region is determined 44 based on a placement mode for the block. The selected region is then placed 46 onto the destination image 34 at the idealized position of the selected region. Referring to FIG. 5, the placement of a region 48 of the test image 14 that is enclosed by a bounding box 50 at its idealized location on the destination image 34 relative to its corresponding data field 52 is illustrated. Referring to FIG. 6, the placement of a region 54 of the test image 14 corresponding to a block, the block including a plurality of data fields, is illustrated. Once all the data fields are processed, the generation of the idealized image 22 is complete.

Figure 7A:
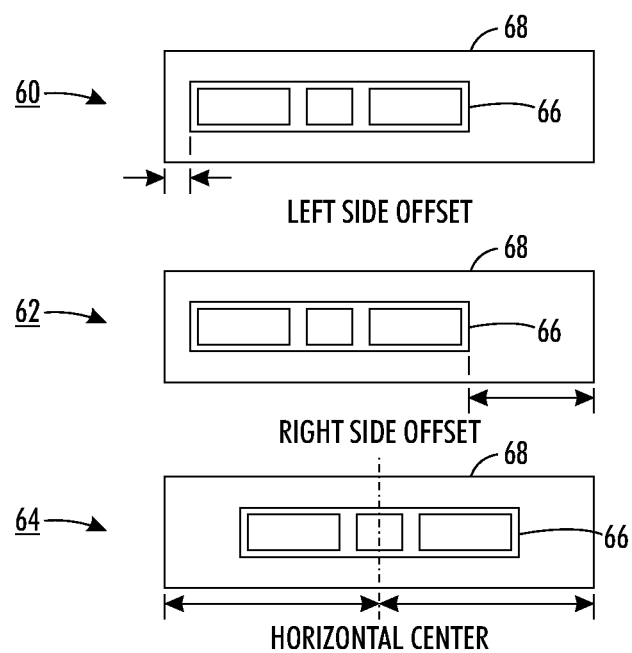
FIG. 7A illustrates a plurality of different horizontal components for a placement mode.
Figure 7B:
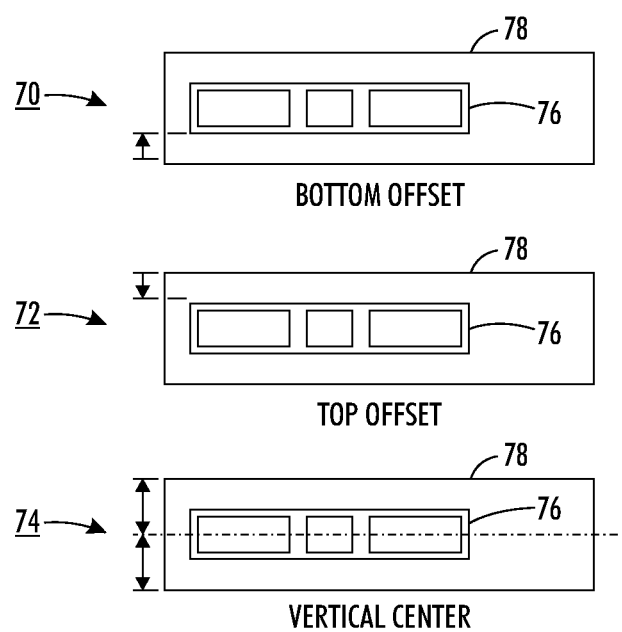
FIG. 7B illustrates a plurality of different vertical components for a placement mode.

The placement mode of a block states how corresponding word boxes should be placed ideally in the data field(s) of the block. Each placement mode includes a horizontal component and a vertical component defining idealized placement of the word boxes in the data field(s) relative to data field boundary. The horizontal component is typically one of: (1) left-side offset; (2) right-side offset; and (3) horizontal center. The vertical component is typically one of: (1) bottom offset; (2) top offset; and (3) vertical center. With reference to FIG. 7A, a plurality of different horizontal components 60, 62, 64 are illustrated for a plurality of data items 66 relative to a corresponding data field 68. With reference to FIG. 7B, a plurality of different vertical components 70, 72, 74 are illustrated for a plurality of data items 76 relative to a corresponding data field 78.

Figure 8:
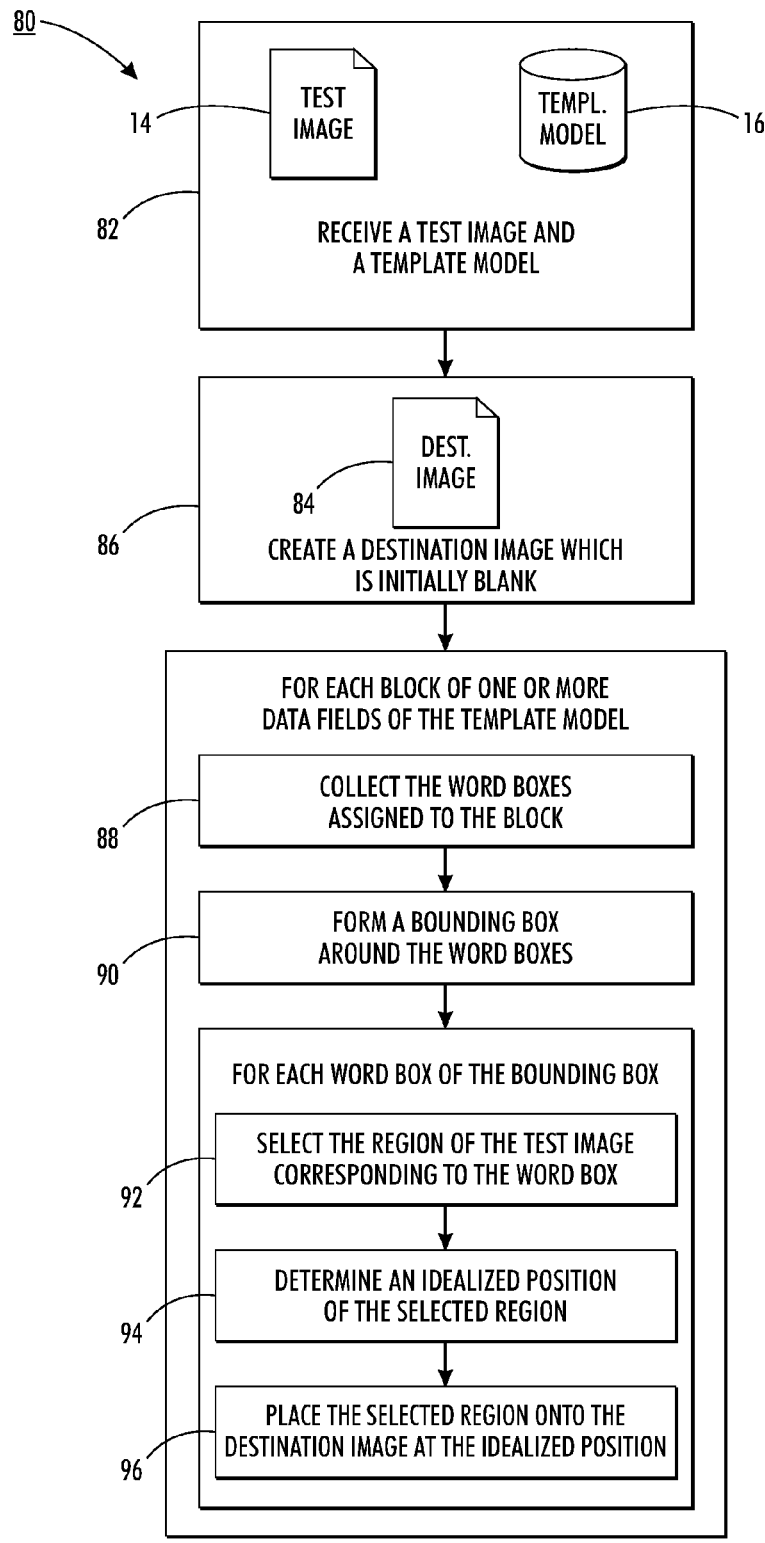
FIG. 8 illustrates a block diagram of an alternative method for generating an idealized image of the form.

With reference to FIG. 8, a block diagram of an alternative method 80 for generating the idealized image 22 is provided. The method 80 includes receiving 82 the test image 14 and the template model 16. A destination image 84 with the same dimensions as the page defined by the template model 16 is created 86. For each block of the template model 16, the word boxes assigned to the block are collected 88 and a bounding box is formed 90 around the word boxes. As in the method 30, a block is a collection of one or more data fields. The blocks of the template model 16 include all the data fields of the template model 16 and are mutually exclusive (i.e., no block includes a data field of another block). Typically, a block includes only one data field. However, it may be desirable to displace certain data fields together. Hence, a block can include a plurality of data fields in such a situation. For each word box of the bounding box, the region of the test image 14 defined by the word box is selected 92 and an idealized position of the selected region is determined 94 based on a placement mode for the block and the offset of the word box with respect to the bounding box. Namely, the idealized placement of the bounding box is determined as described above in connection with the determining 44 of the method 30 of FIG. 4. Thereafter, the offset of the word box within the bounding box is added to the idealized location of the bounding box. The selected region is then placed 46 on the destination image 34 at the idealized position of the selected region. Once all the data fields are processed, the generation of the idealized image 22 is complete. In contrast to the method 30 of FIG. 3 which places the content of bounding boxes on the destination image 34, the method 80 places each word box on the destination image 84.

Again as mentioned and referring back to FIG. 3, once the idealized image 22 has been generated, zonal OCR is performed 26 on the idealized image 26. One advantage of zonal OCR is that the accuracy of OCR is enhanced by constraining the character set and character combinations (lexicon) allowed on a per-field basis. Another advantage is that it can be built into highly efficient production workflows. In a production setting, it can be cumbersome or impossible to redefine the boundaries of each data field in a zonal OCR process on an image-by-image basis using the output of the assignment algorithm. The OCRed data is then extracted 28 and assigned to corresponding data fields.

Figure 9:
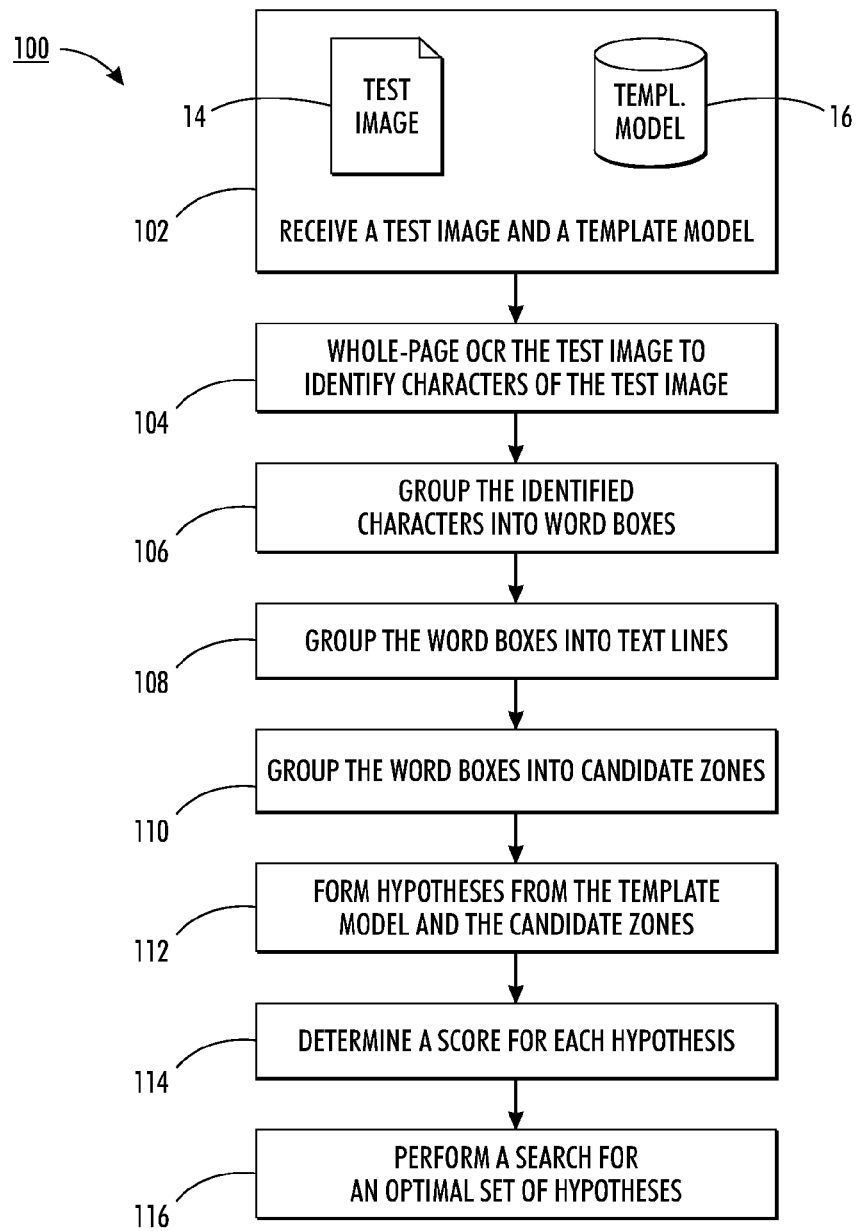
FIG. 9 illustrates a block diagram of a Template Form Parser (TFP) method.

With reference to FIG. 9, a block diagram of a Template Form Parser (TFP) method 100 performing the identification 18 and the assignment 20 of FIG. 3 is provided. A further description of the TFP method 100 is discussed in U.S. patent application Ser. No. 13/537,630 for SYSTEM AND METHOD FOR LOCALIZING DATA FIELDS ON STRUCTURED AND SEMI-STRUCTURED FORMS, by Eric Saund, filed on even date herewith, incorporated herein by reference in its entirety.

The TFP method 100 includes receiving 102 the test image 14 and the template model 16. The test image 14 undergoes whole-page OCR 104 to identify characters of the test image 14. The identified characters are then grouped 106 into the word boxes. As noted above, a word box identifies a bounding box for a grouping of characters on a text line. Commercially available OCR engines are known which can generate the word boxes.

Figure 10:
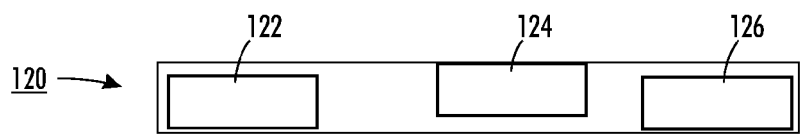
FIG. 10 illustrates a text line and corresponding word boxes.

After generating the word boxes, the word boxes are grouped 108 into text lines spanning the full width of the form. In one embodiment, word boxes are grouped by clustering word boxes according to vertical (y-axis) position. For example, if word boxes are within a predetermined distance of a horizontal line, the word boxes are part of a common text line. With reference to FIG. 10, an example of a text line 120 and the corresponding word boxes 122, 124, 126 forming the text line 120 is provided.

Referring back to FIG. 9, the word boxes are grouped 110 into larger groups, called candidate zones, based on their spatial arrangements. The candidate zones need not be mutually exclusive and can overlap. In one embodiment, a candidate zone is created for each contiguous sequence of one or more word boxes along horizontal text lines. A pair of word boxes can be considered contiguous if the word boxes lay in the same text line and the spatial distance between the word boxes along the text line is less than a predetermined amount and no other word box lies between them. For example, if the word boxes are horizontally (x-axis) separated by less than a predetermined amount and lay in the same text line and no other word box lies between them, they form a contiguous sequence. In other embodiments, candidate zones may be formed from multiple text lines. Each candidate zone is a candidate for assignment to a data field of the form.

Figure 11:
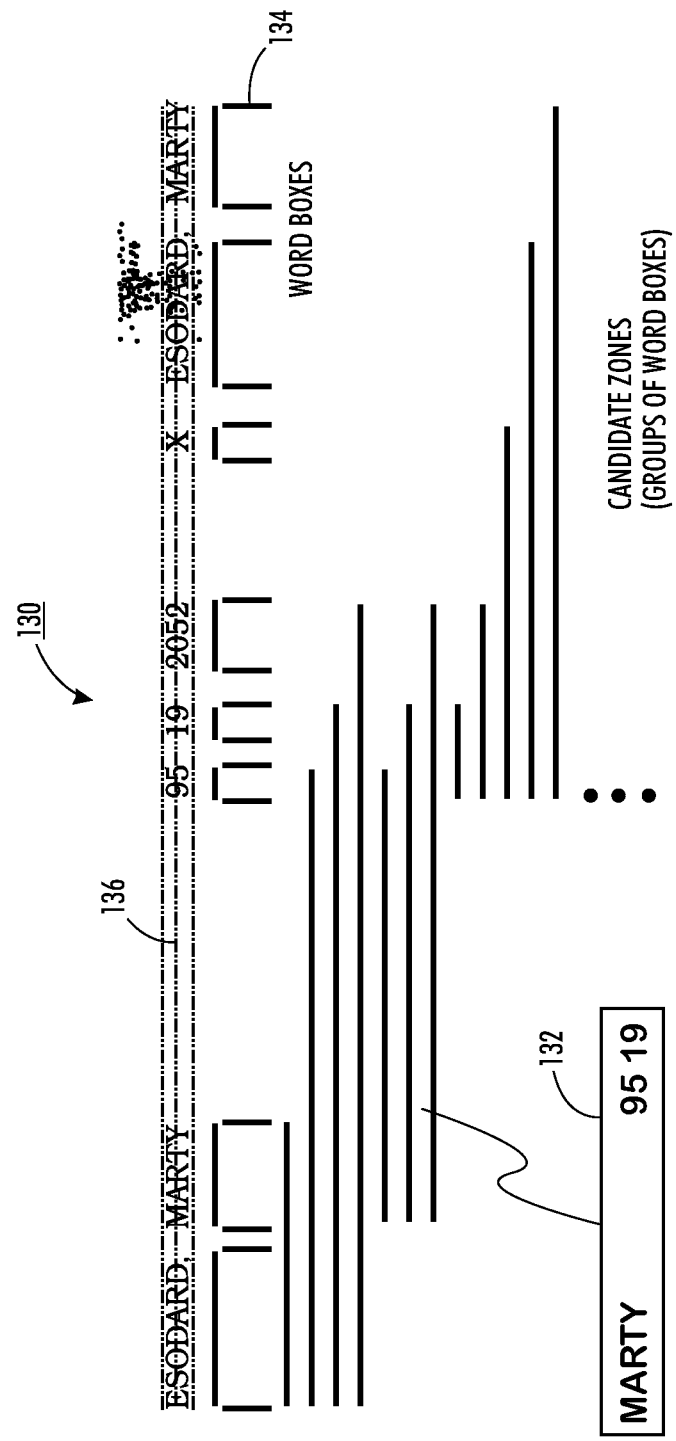
FIG. 11 illustrates a method for constructing candidate zones.

With reference to FIG. 11, a method 130 for constructing candidate zones 132 from word boxes 134 of a text line 136 is graphically illustrated. The method 130 constructs all sets of contiguous word boxes, limited by one or more constraints. Different instantiations of the method 130 may be designed to adopt different constraints. One constraint is the maximum number of word boxes allowed in a candidate zone. Another constraint is the maximum horizontal (x-axis) gap between successive word boxes.

Figure 12A:
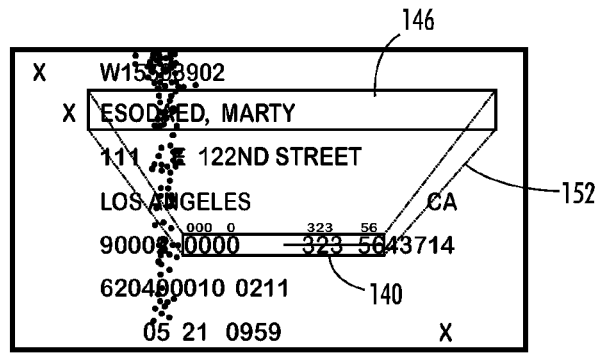
FIGS. 12A-C illustrate regions of an image and corresponding candidate zone/data field assignment hypotheses.
Figure 12B:
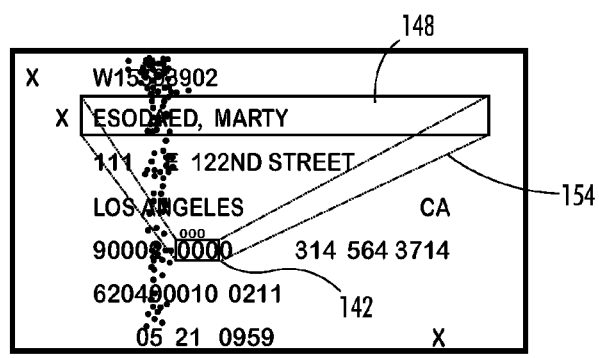
Figure 12C:
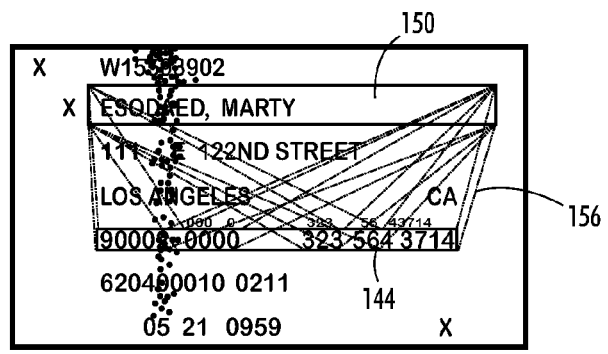

Referring back to FIG. 9, a plurality of zone-candidate/data-field hypotheses are formed 112 for the template model 16. Each hypothesis assigns a candidate zone to a data field of the template model 16 or a null data field (i.e., no data field at all). In some embodiments, the hypotheses are formed exhaustively in other words, for each combination of candidate zone and data field of the template model 16, a hypothesis mapping the candidate zone to the data field is formed. Further, for each candidate zone, a hypothesis mapping the candidate zone to a null data field is formed. In other embodiments, less exhaustive approaches to forming the hypotheses are employed. For example, the hypothesis scoring factors, discussed hereafter, can be employed to score a possible hypothesis. If the score is less than a predetermined threshold, the hypothesis is not formed. For example, a hypothesis is only formed for a combination of a candidate zone and a data field of the template model 16 when the distance between the candidate zone and the data field is less than a predetermined threshold. As another example, a hypothesis is only formed for a combination of a candidate zone and a data field of the template model 16 when the sizes of the candidate zone and the data field are within a predetermined amount of each other. With reference to FIGS. 12A-C, example regions of the test image 14 are enlarged. Candidate zones 140, 142, 144 are related to data fields 146, 148, 150 of the form by hypothesis 152, 154, 156.

Referring back to FIG. 9, for each hypothesis, a score-cost of the assignment is determined 114. For each hypothesis with a null data field, the score-cost is the sum of null costs of the constituent word boxes. The null cost of a word box is predetermined by an operator of the TFP method 100 and serves as a bias in favor of assigning candidate zones to data fields. For each hypothesis with an assignment to a data field of the template model 16, the score-cost assesses the likelihood or compatibility of the assignment of the candidate zone to the data field and is based on one or more factors. The factors may include one or more of the following factors:

1) the number of characters in the word boxes of the candidate zone that are not found in a list of characters expected to occur in the data field;

2) the number of characters in the candidate zone minus the maximum number of characters expected to occur in the data field;

3) the vertical overlap proportion of the bounding boxes of the candidate zone and the corresponding data field;

4) the size similarity between the bounding boxes of the candidate zone and the corresponding data field;

5) the horizontal displacement of the lower left corners of the candidate zone and the corresponding data field;

6) the vertical displacement of the lower left corners of the candidate zone and the corresponding data field;

7) the proximity of the leftmost and rightmost word boxes of the candidate zone to word boxes not included in the candidate zone; and, 8) the density of characters in the candidate zone compared to bounding box size of the candidate zone.

In computing a score-cost for a hypothesis with an assignment to a data field of the template model 16, a numeric score-cost is computed for each factor in terms of a cost. In one embodiment, a score of 0.0 indicates perfect compatibility between the candidate zone and the data field, and a score above 0.0 indicates some degree of incompatibility. The score-costs of all factors are summed, so that incompatibility of any of these factors contributes to a score-cost contraindicating the hypothesis. The summation may be weighted to favor factors better indicating incompatability.

After generating the hypotheses, an optimization search is performed 116 for a set of the hypotheses resulting in an optimal assignment of candidate zones to data fields of the template model 16. The set is selected on the basis of two types of constraints, a hard constraint and a soft constraint. The hard constraint, called the nonoverlapping support constraint, is that no candidate zone may be accepted in the final selection of accepted zones if any of its constituent word boxes is a member of any other accepted zone. The soft constraint is that low-score-cost assignments are preferred. The optimal assignment is the set of hypotheses that minimizes the sum of score costs while satisfying the hard constraint. The sum of score costs for an assignment is the sum of the score costs of the hypotheses forming the assignment.

Figure 13:
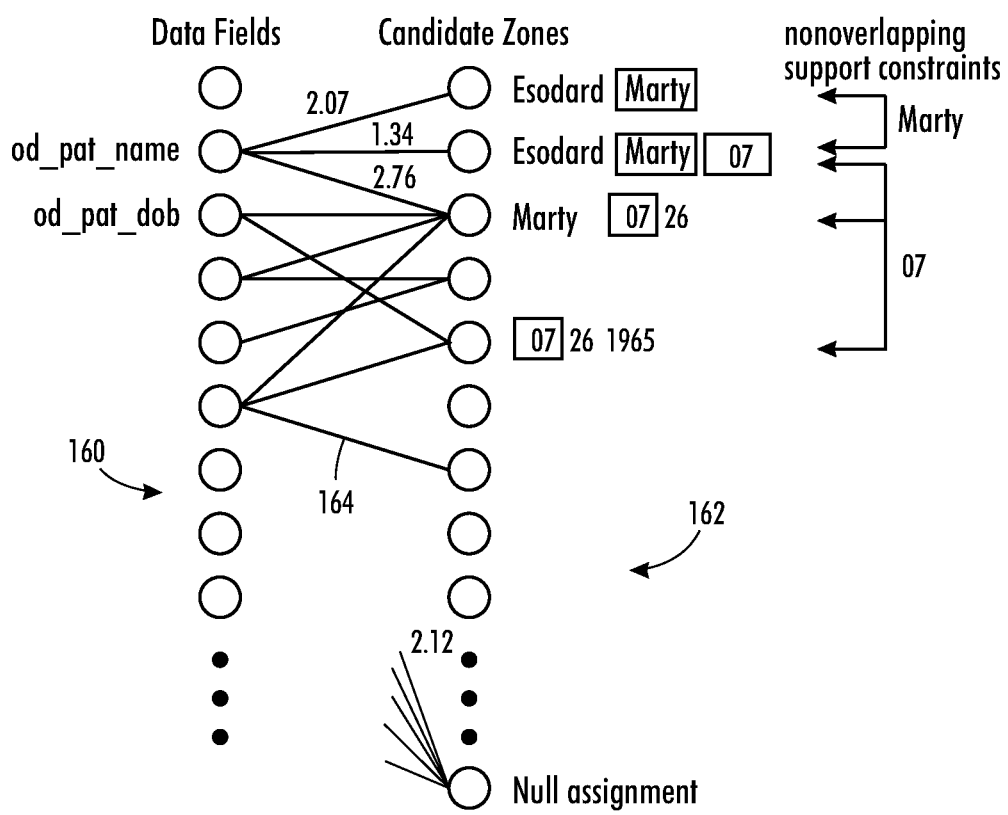
FIG. 13 illustrates an optimization search for a set of optimal hypothesis.

With reference to FIG. 13, an optimization search is illustrated. The left column of nodes 160 corresponds to the data fields of the form and the right column of nodes 162 corresponds to the candidate zones. The lines 164 between the nodes correspond to hypotheses and are annotated with the score-costs. As discussed above, the optimization search chooses the set of hypotheses that minimizes the score cost of the set of hypotheses, subject to the hard constraint that candidate zones cannot overlap in their word-box support.

Referring back to FIG. 9, the optimization search is suitably performed using a Best-First-Leaf-Search (BFLS) optimization algorithm. An example of the BFLS search is discussed in U.S. patent application Ser. No. 12/788,852 for SYSTEM AND METHOD FOR EFFICIENT INTERPRETATION OF IMAGES IN TERMS OF OBJECTS AND THEIR PARTS, by Prateek Sarkar and Evgeniy Bart, filed on May 27, 2010, incorporated herein by reference in its entirety. However, other algorithms can perform the optimization search, such as, for example, greedy search, A-star search, linear constraint solver, and the like. Once the optimization search is complete, the assignment of the word boxes to the data fields is known.

Figure 14:
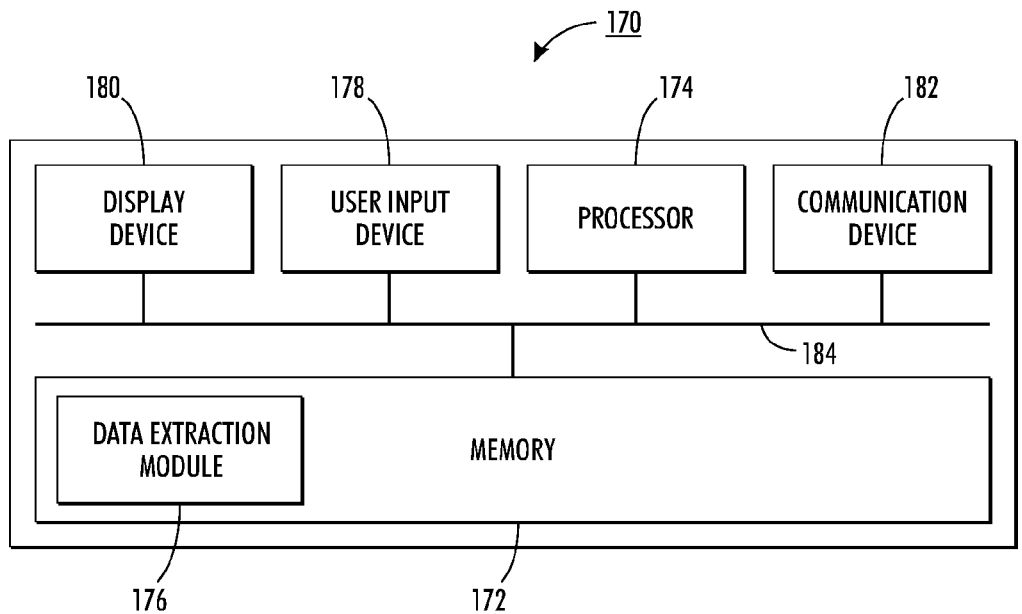
FIG. 14 illustrates a data extraction system.

With reference to FIG. 14, a data extraction system 170 includes at least one memory 172 and at least one processor 174. The memory 172 includes a data extraction module 176 comprised of processor executable instructions that perform the method 10 of FIG. 3. During use of the system 170, the processor 174 executes the processor executable instructions of the data extraction module 176 to perform the method 10 of FIG. 3. In this way, the processor 174 is programmed to perform the method 10 of FIG. 3.

The system 170 can further include, or be operatively connected with, one or more user input devices 178 for receiving user input to control the system 170. For example, the user input devices 178 can be employed to create and/or otherwise specify template models employed by the data extraction module 178. Further, the system 170 can further include, or be operatively connected with, one or more display devices 180 for displaying output generated by the system 170. An optional communication device 182 allows the system 170 to communicate with other systems, for example, over a communications network, such as the Internet, a local area network, a wide area network, and the like. At least one system buses 184 of the system 170 interconnect components thereof, such as the memory 172 and the processor 174.

Figure 15:
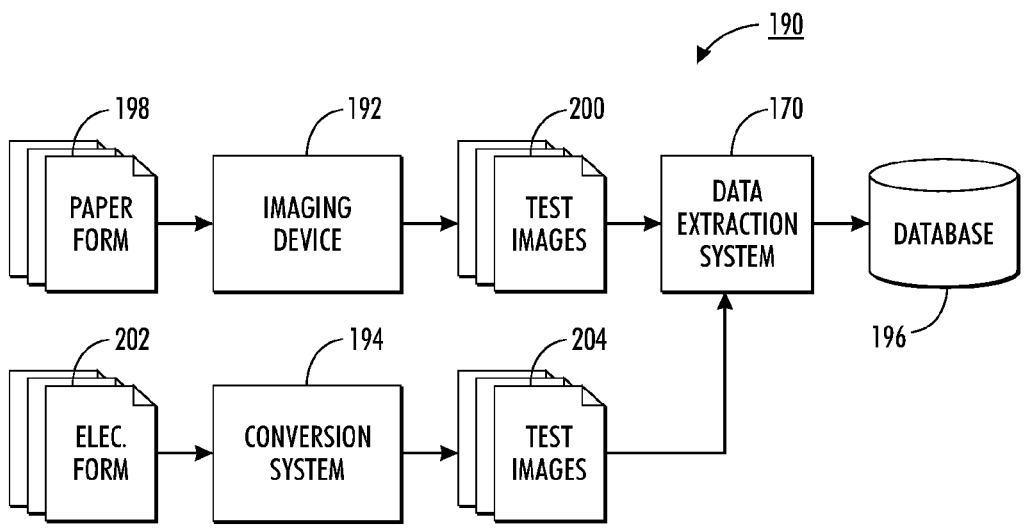
FIG. 15 illustrates a form processing system employing the data extraction system of FIG. 14.

With reference to FIG. 15, a form processing system 190 employing the data extraction system 170 of FIG. 14 is illustrated. The form processing system 190 may include an imaging device 192, a conversion system 194, the data extraction system 170 of FIG. 14 and a database 196. Notably, however, the form processing system 190 may only include one of the imaging device 192 and the conversion system 194.

The imaging device 192 converts one or more paper forms 198 into test images 200. The imaging device 192 may be one or more of a camera, a scanner, and the like. In certain embodiments, the imaging device 192 may receive the paper forms 198 via a conveyor path extending from a feed tray. However, other means of receiving the paper forms 198 are equally amenable. For example, in certain embodiments, an operator of the form processing system 190 may feed the paper forms 198 to the imaging device 192. The conversion system 194 converts one or more electronic forms 202 into test images 204. Electronic forms 202 can be formatted in PDF, XML, Word, and the like. The electronic forms 202 may be loaded from a magnetic or optical media or a network.

The data extraction system 170 processes the test images 200, 204 to extract data contained therein according to the method 10 of FIG. 3. Suitably, the data extraction system 170 may receive the test images 200, 204 via a communications network, such as the Internet, a local area network, a wireless network, and the like. However, in other embodiments, the data extraction system 170 may receive the test images 200, 204 via a data bus, such as USB, Firewire, etc., a storage medium, such as a CD, a thumb drive, etc., and the like.

The database 196 stores data extracted from the test images 200, 204. Suitably, the database 196 receives the data from the data extraction system 170 via a communications network, such as the Internet, a local area network, a wireless network, and the like. In certain embodiments, the database 196 may be distributed across a plurality of computer servers interconnected by a communications network. The database 196 suitably stores the data in a table structure having fields corresponding to the fields of the forms.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), an FPGA, and the like; a user input device includes one or more of a mouse, a keyboard, a touch screen display, one or more buttons, one or more switches, one or more toggles, and the like; a database includes one or more memories; and a display device includes one or more of a LCD display, an LED display, a plasma display, a projection display, a touch screen display, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating an idealized image of a form, said method comprising:

receiving by at least one processor an image of a form and a template model of the form, the form including data fields;

identifying by the at least one processor word boxes of the image, at least one of the word boxes at least partially laying outside nominal bounds of a particular corresponding data field of the image of the received form;

assigning by the at least one processor the word boxes to corresponding data fields of the form;

re-positioning the at least one of the word boxes partially laying outside the nominal bounds fully within the nominal bounds of the associated data field of the idealized image of the form; and, generating by the at least one processor an idealized image of the form based on the assignments and the template model.

2. The method according to claim 1, wherein the template model identifies, for each data field of the form, type of text pattern the data field is expected to contain and placement, including location and size, of the data field on the form.

3. The method according to claim 1, wherein the form is a color-dropout form and the image is without background information of the form.

4. The method according to claim 1, wherein the identifying includes:

whole page optical character recognizing the image to identify characters of the image; and, grouping the identified characters to form the word boxes.

5. The method according to claim 1, wherein the assigning includes:

grouping the word boxes into candidate zones, each candidate zone including one or more of the word boxes;

forming hypotheses from the data fields and the candidate zones, each hypothesis assigning one of the candidate zones to one of the data fields; and, performing a constrained optimization search of the hypotheses for an optimal set of hypotheses, the optimal set of hypotheses optimally assigning the word boxes to corresponding data fields.

6. The method according to claim 5, further including:

determining, for each of the hypotheses, a match quality between the candidate zone of the hypothesis and the data field of the hypothesis.

7. The method according to claim 6, wherein the constrained optimization search is constrained by a hard constraint and a soft constraint, the soft constraint giving preference to sets of hypotheses with high match quality, and the hard constraint precluding a set of hypotheses from including candidate zones overlapping in word-box support.

8. The method according to claim 5, further including:

determining a hypothesis scoring factor;

wherein if the hypothesis scoring factor is less than a predetermined threshold, a hypothesis corresponding to the scoring factor is not formed.

9. The method according to claim 1, wherein the at least one of the word boxes which was at least partially laying outside nominal bounds of a particular corresponding data field are comprised of a string of text.

10. The method according to claim 1, wherein the generating includes:

creating a destination image; and, for each block of one or more of the data fields, wherein each of the blocks are mutually exclusive, with no block including a data field of another block:

collecting word boxes assigned to the one or more data fields of the block;

forming a boundary box around the word boxes;

selecting a region of the image corresponding to the collected word boxes within the boundary box;

determining an idealized position of the selected region according to a placement mode of the selected region, wherein the placement mode states how corresponding word boxes should be placed ideally within the data fields of the block; and, placing the selected region on the destination image at the idealized position.

11. The method according to claim 10, wherein the placement mode includes a horizontal component and a vertical component specifying idealized placement of the word boxes in the data fields relative to a data field boundary.

12. The method according to claim 1, wherein the generating includes:

creating a destination image; and, for each block of one or more of the data fields:

collect word boxes assigned to the one or more data fields of the block;

for each of the collected word boxes:

select a region of the image corresponding to the collected word box;

determine an idealized position of the selected region according to a placement mode of the selected region; and, place the selected region on the destination image at the idealized position.

13. The method according to claim 1, further including:

performing zonal optical character recognition on the idealized image to identify data entries; and, extracting the identified data entries.

14. The method according to claim 1, further comprising:

forming a plurality of hypothesis;

wherein a hypothesis of the plurality of hypothesis assigns a candidate zone to a null data field; and another hypothesis of the plurality of hypotheses assigns another candidate zone to a data field of the template model.

15. A system for generating an idealized image of a form, said system comprising:

at least one processor programmed to:

receive an image of a form and a template model of the form, the form including data fields;

identify word boxes of the image, at least one of the word boxes at least partially laying outside nominal bounds of a particular corresponding data field of the image of the received form;

assign the word boxes to corresponding data fields of the form;

re-position the at least one of the word boxes partially laying outside the nominal bounds fully within the nominal bounds of the associated data field of the idealized image of the form; and, generate an idealized image of the form based on the assignments and the template model.

16. The system according to claim 15, wherein the form is a color-dropout form and the image is without background information of the form.

17. The system according to claim 15, wherein the assigning includes:

grouping the word boxes into candidate zones, each candidate zone including one or more of the word boxes;

forming hypotheses from the data fields and the candidate zones, each hypothesis assigning one of the candidate zones to one of the data fields; and, performing a constrained optimization search of the hypotheses for an optimal set of hypotheses, the optimal set of hypotheses optimally assigning the word boxes to corresponding data fields.

18. The system according to claim 17, wherein the at least one processor is further programmed to:

determine a hypothesis scoring factor; and if the hypothesis scoring factor is less than a predetermined threshold, not form a hypothesis corresponding to the scoring factor.

19. The system according to claim 18, wherein the hypothesis scoring factor comprises a distance between a candidate zone and a data field.

20. The system according to claim 18, wherein the hypothesis scoring factor comprises a size difference between a candidate zone and a data field.

21. The system according to claim 15, wherein the generating includes:

creating a destination image; and, for each block of one or more of the data fields, wherein each of the blocks are mutually exclusive, wherein no block includes a data field of another block:

collecting word boxes assigned to the one or more data fields of the block;

forming a boundary box around the word boxes;

selecting a region of the image corresponding to the collected word boxes within the boundary box;

determining an idealized position of the selected region according to a placement mode of the selected region, wherein the placement mode states how corresponding word boxes should be placed ideally within the data fields of the block; and, placing the selected region on the destination image at the idealized position.

22. The system according to claim 21, wherein the placement mode includes a horizontal component and a vertical component specifying idealized placement of the word boxes in the data fields relative to a data field boundary.

23. The system according to claim 15 wherein the generating includes:

creating a destination image; and, for each block of one or more of the data fields:

collect word boxes assigned to the one or more data fields of the block;

for each of the collected word boxes:

select a region of the image corresponding to the collected word box;

determine an idealized position of the selected region according to a placement mode of the selected region; and, place the selected region on the destination image at the idealized position.

24. The system according to claim 15, further including:

at least one processor programmed to:

perform zonal optical character recognition on the idealized image to identify data entries; and, extract the identified data entries.

25. A data extraction system comprising:

at least one processor programmed to:

receive an image of a form and a template model of the form, the form including data fields;

identify word boxes of the image, wherein the word boxes are data items which include a string of text, at least some of the text string located within corresponding ones of the data fields;

group the word boxes into candidate zones, each candidate zone including one or more of the word boxes;

form hypotheses from the data fields and the candidate zones, each hypothesis assigning one of the candidate zones to one of the data fields;

perform a constrained optimization search of the hypotheses for an optimal set of hypotheses, the optimal set of hypotheses optimally assigning the word boxes to corresponding data fields;

generate an idealized image of the form based on the assignments and the template model, wherein the idealized image includes at least one of the word boxes which was at least partially laying outside nominal bounds of a particular corresponding data field of the image of the received form, and the at least one of the word boxes being re-positioned fully within the nominal bounds of the associated data field of the idealized image of the form;

perform zonal optical character recognition on the idealized image to identify data entries; and, extract the identified data entries.

* * * * *